United States Patent [19]

Sutter, Jr. et al.

[11] Patent Number: 4,891,819
[45] Date of Patent: Jan. 2, 1990

[54] RF EXCITED LASER WITH INTERNALLY FOLDED RESONATOR

[76] Inventors: Leroy V. Sutter, Jr., 44 Rocky Knoll Dr.; Harold A. Cameron, 2382 Morse Ave., both of Irvine, Calif. 92714; Michael R. Davison, 22935 Briarcroft, El Toro, Calif. 92630

[21] Appl. No.: 298,109

[22] Filed: Jan. 17, 1989

[51] Int. Cl.$^4$ .......................... H01S 3/097; H01S 3/00
[52] U.S. Cl. .......................................... 372/82; 372/38; 372/61; 372/87; 372/93
[58] Field of Search .................... 372/82, 81, 83, 55, 372/61, 64, 62, 92, 93, 94, 99, 29, 38, 35, 87

[56] References Cited

U.S. PATENT DOCUMENTS

| | | | |
|---|---|---|---|
| 4,169,251 | 9/1979 | Laakmann | 372/64 |
| 4,352,188 | 9/1982 | Griffith | 372/82 |
| 4,455,658 | 6/1984 | Sutter, Jr. | 372/82 |
| 4,464,760 | 8/1984 | Sutter, Jr. | 372/82 |
| 4,468,776 | 8/1984 | McLellan | 372/93 |
| 4,499,582 | 2/1985 | Karning et al. | 372/93 |
| 4,589,114 | 5/1986 | Sutter, Jr. | 372/61 |
| 4,620,306 | 10/1986 | Sutter, Jr. | 372/82 |
| 4,679,201 | 7/1987 | Klingel | 372/61 |
| 4,703,491 | 10/1987 | Lim | 372/93 |
| 4,740,986 | 4/1988 | Reeder | 372/93 |

Primary Examiner—John D. Lee
Assistant Examiner—Georgia Y. Epps
Attorney, Agent, or Firm—W. Edward Johansen

[57] ABSTRACT

A transversely RF excited gas laser with an internally folded resonator includes an elongated chamber of cross-sectional dimensions suitable for confining a laser gas discharge, a plurality of reflectors and a laser gas. The reflectors form a stable folded laser resonator cavity of a compact geometry in order to efficiently extract laser power from the laser resonator cavity. There are at least two of the reflectors and at least one of the plurality of reflectors is concave. The laser gas is disposed in the folded resonator cavity which reflect and guide light energy from the laser gas discharge within the elongated chamber. The transversely RF excited gas laser with an internally folded resonator also includes a pair of electrodes and a pair of cooling electrodes. The electrodes are transversely disposed on the elongated chamber and excite the laser gas. The cooling electrodes are transversely disposed on the elongated chamber and electrically coupled to ground. The impedance-matching circuit applies RF power to the electrodes. The impedance-matching circuit includes three inductors with a center-tapped coil being adjusted so that the voltage potential at the center of the laser discharge between the pair of cooling electrodes is a virtual ground thereby preventing RF current from passing through the grounded cooling electrodes in order to efficiently extract laser power from the laser resonator cavity.

2 Claims, 2 Drawing Sheets

RF EXCITED LASER WITH INTERNALLY FOLDED RESONATOR

BACKGROUND OF THE INVENTION

1. Field of the Invention

This invention relates to an RF excited laser which incorporates a ceramic bore and more particularly to an RF excited laser which has an internally folded resonator.

2. Description of the Prior Art

U.S. Pat. No. 4,464,760, entitled Elongated Chamber for Use in Combination with a Transversely Excited Gas Laser, issued to Leroy V. Sutter, Jr. on Aug. 7, 1984, teaches an laser bore and electrode structure which includes a ceramic bore.

U.S. Pat. No. 4,723,256, entitled Optical Resonator for Laser Oscillating Apparatus, issued to Ethan D. Hoag on Feb. 2, 1988, teaches an optical resonator for a laser oscillating apparatus which has an arrangement of folding mirrors facing one another across the lasing gas medium that radiates the laser beam. The arrangement includes a pair of reflecting surface which are approximately orthogonal to one another and effectively face the lasing gas medium an a whole. Also, the laser beam which is incident from the lasing gas medium is caused to be reflected successively from both reflecting surfaces to be emitted in the direction of the lasing gas medium.

U.S. Pat. No. 4,499,582, entitled Laser System, issued to Henrich Karning, Franz Prein and Karl-Heinz Vierling on Feb. 12, 1985, teaches a laser system with a folded beam path which is formed by a plurality of mirrors. Each mirror reflects light in a closed loop from one mirror to another mirror. Electrodes are disposed on opposite sides of the path between the mirrors and form channels through which the folded beam path extends.

U.S. Pat. No. 4,446,559, entitled Laser with Annular Resonator, issued to Karlheinz von Bieren on May 1, 1984, teaches a laser resonator in which the extent of diffraction is controlled in order to provide the desired oscillation sustaining feedback.

U.S. Pat. No. 4,352,188, entitled RF Pumped Waveguide Laser with Inductive Loading for Enhancing Discharge Uniformity, issued to Glen A. Griffith on Sept. 28, 1982, teaches a discharge-excited waveguide gas laser which utilizes a transverse RF excitation voltage at a frequency of at least about 30 MHz applied between elongated electrodes on opposite sides of the laser discharge chamber and which a plurality of shunt inductances coupled between the electrodes externally along the length of the chamber. These inductances provide a negative admittance which compensates for the variation in the phase angle of the transmission line reflection coefficient along the length of the laser discharge chamber. The variation in the magnitude of the standing wave voltage is reduced accordingly thereby improving the uniformity of the laser-exciting discharge.

U.S. Pat. No. 4,169,251, teaches Waveguide Gas Laser with High Frequency Transverse Discharge Excitation, issued to Katherine D. Laakman on Sept. 25, 1979, teaches waveguide lasers which are excited by a transverse discharge at RF frequencies generally in the vhf-uhf range, i.e., from about 30 MHz to about 3 GHz. These excitation frequencies are sufficiently high to ensure negligible interaction of discharge electrons with the discharge-establishing electrodes, thereby achieving superior discharge properties which result in a laser of improved performance and reduced size and complexity.

U.S. Pat. No. 4,103,255, entitled High Power, Compact Waveguide Gas Laser, issued Howard R. Schlossberg on July 25, 1978, teaches a high power, compact waveguide gas laser housing located within a resonant cavity. The housing has a longitudinal chamber situated therein. The chamber is divided into a plurality of waveguides by a plurality of infrared transmitting partitions. During operation of the laser, the leakage of laser radiation between adjacent waveguides through the partitions causes coupling of the phases of the waveguide modes thereby producing a laser output of high power.

U.S. Pat. No. 4,468,776, entitled Reinjection Laser Oscillator and Method, issued to Edward J. McLellan on Aug. 28, 1984, teaches a uv preionized carbon dioxide oscillator with integral four-pass amplifier which is capable of providing 1 to 5 GW laser pulses with pulse widths from 0.1 to 0.5 nanoseconds, full width at half maximum (FWHM). The apparatus is operated at any pressure from 1 atm to 10 atm without the necessity of complex high voltage electronics. The reinjection technique employed gives rise to a compact, efficient system that is particularly immune to alignment instabilities with a minimal amount of hardware and complexity.

U.S. Pat. No. 4,679,201, entitled Folded CO2 Laser, issued to Hans Klingel on July 7, 1987, teaches a folded longitudinal carbon dioxide laser with an output of at least several hundred watts which has a geometrical longitudinal axis, a rectilinear tube device of dielectric material containing carbon dioxide.

U.S. Pat. No. 4,703,491, entitled Optical System for Folded Cavity Laser, issued to Gnian C. Lim on Oct. 27, 1987, teaches an optical system for a folded cavity laser which has a partially transmitting output mirror and a fully reflective folding mirror on one side of an active laser medium, and another folding mirror on the other side of the active laser medium disposed so that a resonating laser beam inside the resonator cavity may make multiple passes to obtain a long effective cavity length. Mechanisms are provided for adjusting at least one of the folding mirrors so that the laser beam resonates within the cavity. Mechanisms are also provided for adjusting the output mirror so that misalignments of the folding mirrors are compensated.

U.S. Pat. No. 4,740,986, entitled Laser Resonator, issued to Robin A. Reeder on Apr. 26, 1988, teaches a radiation folding waveguide which includes a reflector. The reflector transmits incident radiation. The reflector has a longitudinal axis along its longest dimension and a bottom edge colinear with the longitudinal axis.

U.S. Pat. No. 4,723,256, entitled Optical Resonator and for Laser Oscillating Apparatus, issued to Ethan D. Hoag on Feb. 2, 1988, teaches an optical resonator for a laser oscillating apparatus which includes a plurality of mirrors which are disposed within a hollow cylindrical housing which define a lasing region therein including a large front folding mirror at one end of the lasing region, a relatively larger rear folding mirror disposed at the opposite end of the lasing region, a relatively small totally reflective concave primary mirror disposed adjacent the front folding mirror and a relatively small semi-transmissive front folding mirror and a relatively small transmissive output mirror is disposed adjacent to both the front and the primary mirror.

SUMMARY OF INVENTION

In view of the foregoing factors and conditions which are characteristic of the prior art it is the primary object of the present invention to provide an RF excited laser which incorporates a ceramic bore and which has an internally folded resonator.

In accordance with the present invention an embodiment of a transversely RF excited gas laser with an internally folded resonator is described. The transversely RF excited gas laser includes an elongated chamber of cross-sectional dimensions suitable for confining a laser gas discharge, a plurality of reflectors and a laser gas. The reflectors form a stable folded laser resonator cavity of a compact geometry in order to efficiently extract laser power from the laser resonator cavity. There are at least two of the reflectors and at least one of the plurality of reflectors is concave. The laser gas is disposed in the folded resonator cavity which reflect and guide light energy from the laser gas discharge within the elongated chamber. The transversely RF excited gas laser with an internally folded resonator also includes a pair of electrodes and a pair of cooling electrodes. The electrodes are transversely disposed on the elongated chamber and excite the laser gas. The cooling electrodes are transversely disposed on the elongated chamber and electrically coupled to ground. The impedance-matching circuit applies RF power to the electrodes. The impedance-matching circuit includes three inductors with a center-tapped coil being adjusted so that the voltage potential at the center of the laser discharge between the pair of cooling electrode is a virtual ground thereby preventing RF current from passing through the grounded cooling electrodes in order to efficiently extract laser power from the laser resonator cavity.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
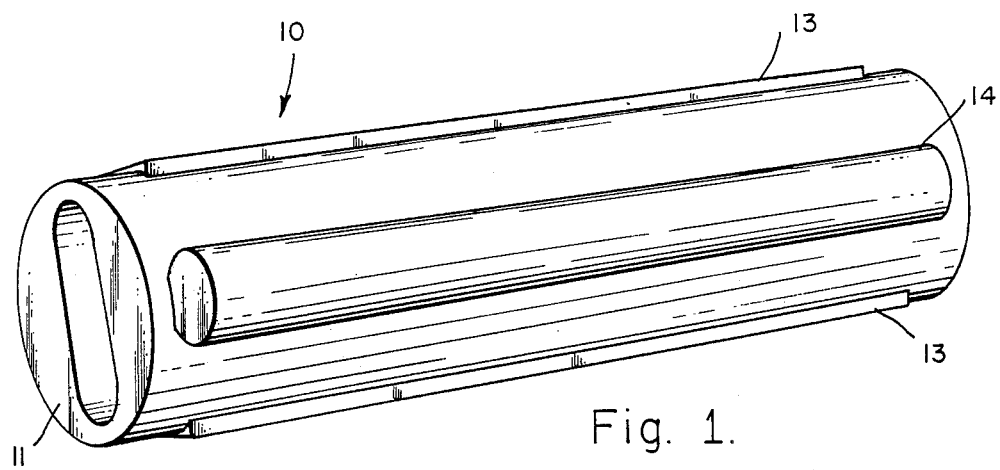
FIG. 1 is a perspective view of an internally folded resonator of a first transversely RF excited gas laser which has been constructed in accordance with the principles of the first embodiment of the present invention.

In order to best understand the present invention it is necessary to refer to the following description of its preferred embodiment in conjunction with the accompanying drawing. Referring to FIG. 1 in conjunction with FIG. 2 and FIG. 3 a first transversely RF excited gas laser 10 with an internally folded resonator includes an elongated chamber 11 of cross-sectional dimensions suitable for confining a laser gas discharge, a plurality of reflectors 12 and a laser gas. The elongated chamber 11 is formed from a dielectric material, such as BeO, Al2O3 or glass. The laser gas may be a standard $CO_2$ laser gas mixture including 65% He, 22% N2, 13% $CO_2$ by mole fraction. A sufficient amount of the laser gas must be maintained in the elongated chamber 11 in order to support the laser gas discharge. The laser gas is at pressure ranging from 1 Torr to about 1000 Torr. The laser gas is sealed in the elongated chamber 11. The reflectors 12 form a stable folded laser resonator cavity of a compact geometry in order to efficiently extract laser power from the laser resonator cavity. There are at least two of the reflectors 12. At least one of the plurality of reflectors 12 is concave. The laser gas is disposed in the folded resonator cavity which reflect and guide light energy from the laser gas discharge within the elongated chamber 11. The optical reflectors 12 reflect light energy from the laser gas discharge within the elongated chamber 11 so that the light energy travels longitudinally the length of the elongated cylindrical chamber 11 and is optically independent of the internal walls of the elongated chamber 11. The transversely RF excited gas laser 10 with an internally folded resonator also includes a pair of electrodes 13 and a pair of cooling electrodes 14. The electrodes 13 are transversely disposed on the elongated chamber 11 and excite the laser gas. The cooling electrodes 14 are transversely disposed on the elongated chamber 11 and electrically coupled to ground.

Figure 2:
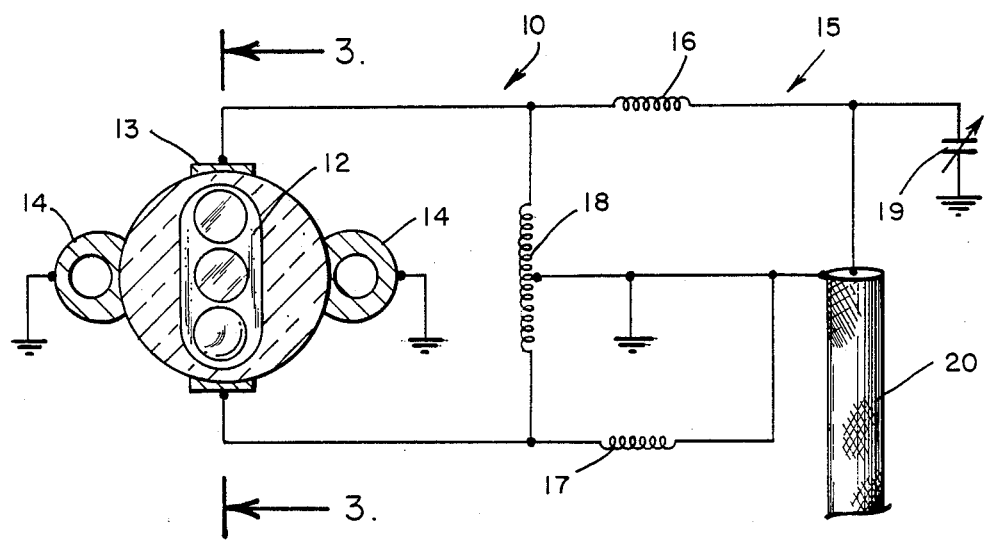
FIG. 2 is a transverse cross-sectional view of the internally folded resonator of FIG. 1 and a schematic drawing of a first impedance-matching circuit of the first transversely RF excited gas laser of FIG. 1.
Figure 3:
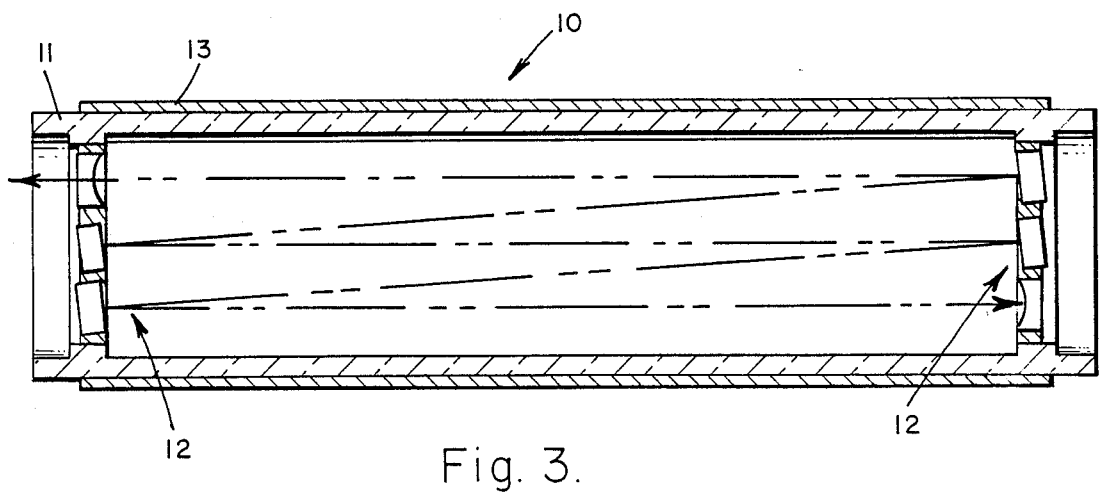
FIG. 3 is a longitudinal cross-sectional view of the internally folded resonator of FIG. 1.
Figure 4:
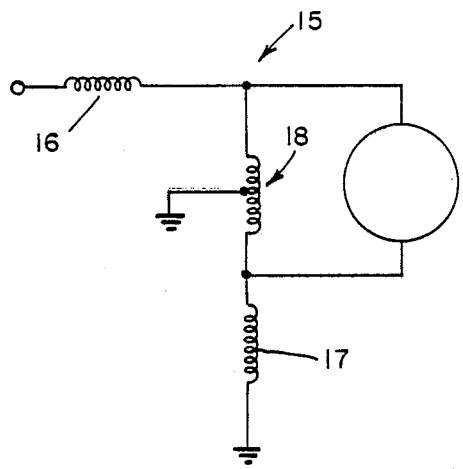
FIG. 4 is a schematic drawing of a first impedance-matching circuit which has been constructed in accordance with the principles of the first embodiment of the present invention.
Figure 5:
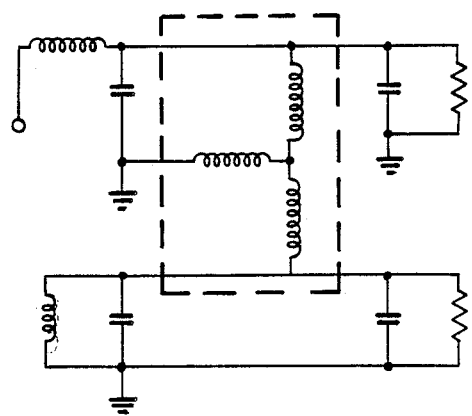
FIG. 5 is a schematic drawing of an equivalant circuit to the first impedance-matching circuit of FIG. 4 for use in balancing of the load.

Referring to FIG. 4 in conjunction with FIG. 2 and FIG. 5 the first impedance-matching circuit 15 applies RF power to the electrodes 13. The impedance-matching circuit 15 includes a series input coil 16, a parallel load coil 17, a center-tapped coil 18 and a tuning capacitor 19. The center-tapped coil 18 is adjusted so that the voltage potential at the center of the laser discharge between the pair of cooling electrodes 14 is a virtual ground thereby preventing RF current from passing through the grounded cooling electrodes 14 in order to efficiently extract laser power from the laser resonator cavity. A coaxial connector 20 electrically couples an RF generator 11 to the first impedance-matching circuit 15. The first impedance-matching circuit 15 is electrically coupled to the electrodes 13. The RF generator 20 provides an alternating electric field in the elongated chamber 11 along a direction transverse to the length of the elongated chamber 11 and at a frequency ranging from 10 MHz to about 3 GHz to establish the laser gas discharge in the laser gas. The first impedance-matching circuit 15 is based on an air-core auto transformer. The balancing of the load is done with the equivalant circuit of FIG. 5.

Again referring to FIG. 2 the transversely RF excited gas laser 10 with an internally folded resonator has n optical reflectors 12 (Rl through Rn) 17, which form a laser resonator. The n reflectors 12 (Rl through Rn) fold the laser resonator into a compact geometry and efficiently extract laser power from the laser cavity. A practical maximum number for n is defined by the maximum electrode gap which the electrodes 13 define and which can still break down the unlit laser gas into a stable discharge. The cooling electrodes 14 are water cooled. The use of the impedance-matching circuit prevents RF interaction of the discharge voltage with the grounded cooling electrodes 14. The center tapped coil 18 is adjusted so that the voltage potential at the center of the laser discharge between the cooling electrodes 14 is a virtual ground so that RF current is prevented from passing through the grounded cooling electrodes 14.

Figure 6:
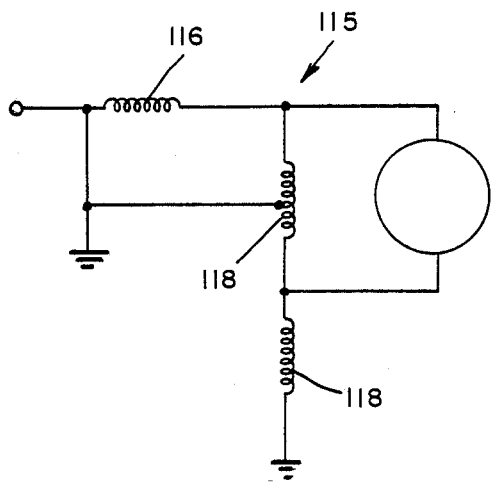
FIG. 6 is a schematic drawing of a second impedance-matching circuit which has been constructed in accordance with the principles of the second embodiment of the present invention.

Referring to FIG. 6 a second impedance-matching circuit 115 applies RF power to the electrodes 13. The second impedance-matching circuit 15 includes a series input coil 116, a parallel load coil 117 and a center-tapped coil 118. The center-tapped coil 118 is adjusted so that the voltage potential at the center of the laser discharge between the pair of cooling electrodes 14 is a virtual ground thereby preventing RF current from passing through the grounded cooling electrodes 14 in order to efficiently extract laser power from the laser resonator cavity. A coaxial connector 20 electrically couples an RF generator 11 to the second impedance-matching circuit 115. The second impedance-matching circuit 115 is electrically coupled to feed points A and B of the electrodes 13. The RF generator 20 provides an alternating electric field in the elongated chamber 11 along a direction transverse to the length of the elongated chamber 11 and at a frequency ranging from 10 MHz to about 3 GHz to establish the laser gas discharge in the laser gas.

Figure 7:
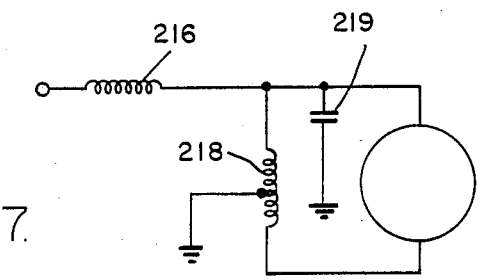
FIG. 7 is a schematic drawing of a third impedance-matching circuit which has been constructed in accordance with the principles of the third embodiment of the present invention.

Referring to FIG. 7 a third impedance-matching circuit 215 applies RF power to the electrodes 13. The third impedance-matching circuit 215 includes a series input coil 216, a center-tapped coil 218 and a capacitor 219. The center-tapped coil 218 is adjusted so that the voltage potential at the center of the laser discharge between the pair of cooling electrodes 14 is a virtual ground thereby preventing RF current from passing through the grounded cooling electrodes 14 in order to efficiently extract laser power from the laser resonator cavity. A coaxial connector 20 electrically couples an RF generator 11 to the third impedance-matching circuit 215. The third impedance-matching circuit 15 is electrically coupled to the electrode 13. The RF generator 20 provides an alternating electric field in the elongated chamber 11 along a direction transverse to the length of the elongated chamber 11 and at a frequency ranging from 10 MHz to about 3 GHz to establish the laser gas discharge in the laser gas.

From the foregoing it can be seen that a transversely RF excited gas laser with an internally folded resonator has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A transversely RF excited gas laser with an internally folded resonator, said transversely RF excited gas laser comprising:
   a. an elongated chamber of cross-sectional dimensions suitable for confining a laser gas discharge;
   b. a plurality of reflectors which form a stable folded laser resonator cavity of a compact geometry in order to efficiently extract laser power from said laser resonator cavity wherein there are at least two of said plurality of reflectors and at least one of said plurality of reflectors is concave;
   c. a laser gas which is disposed in said folded resonator cavity which reflect and guide light energy from the laser gas discharge within said elongated chamber;
   d. a pair of electrodes are transversely disposed on said elongated chamber and excite said laser gas;
   e. a pair of cooling electrodes are transversely disposed on said elongated chamber and electrically coupled to ground; and
   f. impedance-matching means for applying RF power to said pair of electrodes, said impedance matching means including three inductors with a center-tapped coil being adjusted so that the voltage potential at the center of said laser discharge between said pair of cooling electrodes is a virtual ground thereby preventing RF current from passing through said pair of grounded cooling electrodes in order to efficiently extract laser power from said laser resonator cavity.

2. A transversely RF excited gas laser with an internally folded resonator according to claim 1 wherein the practical maximum number of said reflectors is defined by the maximum electrode gap which said pair of electrodes define and which can still break down the unlit laser gas into a stable discharge.

* * * * *